(12) United States Patent
Gregg

(10) Patent No.: US 8,824,691 B2
(45) Date of Patent: Sep. 2, 2014

(54) APPARATUS AND METHOD FOR MONITORING SOUND IN A PROCESS SYSTEM

(75) Inventor: Jack T. Gregg, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 1572 days.

(21) Appl. No.: 12/024,323

(22) Filed: Feb. 1, 2008

(65) Prior Publication Data

US 2009/0196431 A1     Aug. 6, 2009

(51) Int. Cl.
*H04R 29/00*          (2006.01)

(52) U.S. Cl.
USPC .......................................................... 381/56

(58) Field of Classification Search
None
See application file for complete search history.

(56) References Cited

U.S. PATENT DOCUMENTS

| | | | |
|---|---|---|---|
| 6,691,068 B1 | 2/2004 | Freed et al. | |
| 6,782,345 B1 * | 8/2004 | Siegel et al. | 702/183 |
| 6,845,161 B2 * | 1/2005 | Boss | 381/56 |
| 7,091,832 B1 * | 8/2006 | Butterman et al. | 340/384.72 |
| 7,398,184 B1 | 7/2008 | Chen | |
| 2002/0005894 A1 * | 1/2002 | Foodman et al. | 348/143 |
| 2003/0204371 A1 | 10/2003 | Sciamanna | |
| 2004/0105006 A1 | 6/2004 | Lazo et al. | |
| 2004/0136539 A1 * | 7/2004 | Uhi et al. | 381/56 |
| 2004/0254764 A1 | 12/2004 | Wetzer et al. | |
| 2005/0049732 A1 * | 3/2005 | Kanevsky et al. | 700/94 |
| 2005/0110632 A1 * | 5/2005 | Berezowski et al. | 340/521 |
| 2007/0152809 A1 * | 7/2007 | Berezowski et al. | 340/531 |
| 2008/0122641 A1 | 5/2008 | Amidi | |
| 2008/0123934 A1 | 5/2008 | Amidi | |
| 2008/0140321 A1 * | 6/2008 | Blanc et al. | 702/41 |
| 2009/0010484 A1 | 1/2009 | Amidi | |
| 2012/0219157 A1 * | 8/2012 | Hosaka et al. | 381/56 |

FOREIGN PATENT DOCUMENTS

| | | |
|---|---|---|
| DE | 36 34 628 A1 | 4/1987 |
| EP | 1 501 029 A2 | 1/2005 |
| EP | 1 657 610 A2 | 5/2006 |
| GB | 2 176 640 A | 12/1986 |
| JP | 2004128541 | 4/2004 |

OTHER PUBLICATIONS

"IntelaTrac PKS Redefines Field Data Collection and Management," Honeywell, Feb. 2006, 2 pages.
Honeywell Process Solutions, "IntelaTrac PKS," Honeywell, 2 pages.
Honeywell Process Solutions, "Mobile Station," Honeywell, 2 pages.
"Improve Maintenance Efforts with DocuMint," Honeywell, Feb. 2006, 3 pages.
"Lumidor Minimax XT," Honeywell, Dec. 2005, 4 pages.
"PanOS Platform, Unified Location Management Platform," PanGo, 2007, 2 pages.
"Ekahau T301-A Wi-Fi Tag," ekahau, 2007, 2 pages.

* cited by examiner

*Primary Examiner* — Benjamin Sandvik

(57) ABSTRACT

A method for monitoring sound in a process system is provided that includes sensing sound at a specified location, capturing the sensed sound as sound data, and forwarding the sound data from the specified location to a process control system. The sound data is analyzed at the process control system and a determination is made regarding whether or not to issue a warning based on the analysis of the sound data. For a particular embodiment, the analysis of the sound data includes comparing the sound data to at least one stored sound, and the determination regarding whether or not to issue a warning based on the analysis of the sound data is made based on a level of similarity between the sound data and the stored sound.

20 Claims, 2 Drawing Sheets

APPARATUS AND METHOD FOR MONITORING SOUND IN A PROCESS SYSTEM

TECHNICAL FIELD

This disclosure relates generally to process control systems and more specifically to an apparatus and method for monitoring sound in a process system.

BACKGROUND

Processing facilities, such as manufacturing plants, chemical plants, crude oil refineries, ore processing plants and the like, are often managed using process control systems. Among other operations, process control systems typically manage the use of motors, valves, and other industrial equipment in the processing facilities.

In conventional process control systems, controllers are often used to control one or more processes that are occurring or being implemented. The controllers may, for example, monitor the operation of the industrial equipment, provide control signals to the industrial equipment, and generate alarms when malfunctions are detected. Conventional process control systems are often responsible for monitoring and controlling numerous process variables, which generally represent characteristics of the process being monitored and controlled. In addition, typical process control systems implement video technology to monitor remote and/or hazardous areas, as well as for facility security. Human operators are then often responsible for monitoring and adjusting the controllers in the process control systems, thereby helping to ensure that the controllers are accurately modeling and controlling the processes.

SUMMARY

This disclosure provides an apparatus and method for monitoring sound in a process system.

In a first embodiment, a method includes sensing sound at a specified location. The sensed sound is captured as sound data, which is forwarded from the specified location to a process control system. The sound data is analyzed at the process control system. A determination is made regarding whether to issue a warning based on the analysis of the sound data.

In particular embodiments, analyzing the sound data at the process control system includes comparing the sound data to at least one stored sound.

In other particular embodiments, determining whether to issue a warning based on the analysis of the sound data includes determining a level of similarity between the sound data and the stored sound.

In yet other particular embodiments, forwarding the sound data to the process control system includes forwarding the sound data to a controller within the process control system.

In other particular embodiments, the specified location is remote from the process control system, and forwarding the sound data from the specified location includes transmitting the sound data over a wireless network from a wireless sound sensor at the specified location.

In still other particular embodiments, the method further includes sending the sound data from an operator station to a speaker.

In a second embodiment, an apparatus includes a sound sensor and a sound data analyzer within a process control system. The sound sensor is operable to sense sound at a specified location, to capture the sensed sound as sound data, and to forward the sound data from the specified location to the process control system. The sound data analyzer is operable to analyze the sound data and to determine whether to issue a warning based on the analysis of the sound data.

In particular embodiments, the sound sensor is a wireless sound sensor.

In other particular embodiments, the sound data analyzer is operable to analyze the sound data by comparing the sound data to at least one stored sound.

In yet other particular embodiments, the sound data analyzer is operable to determine whether to issue a warning based on the analysis of the sound data by determining a level of similarity between the sound data and the stored sound.

In still other particular embodiments, the apparatus includes a sound data provider within the process control system. The sound data provider is operable to send the sound data to a speaker.

In other particular embodiments, the apparatus also includes a plurality of sound sensors, with each of the sound sensors operable to sense sound at a specified location, to capture the sensed sound as sound data, and to forward the sound data from the specified location to the process control system. The sound data analyzer is further operable to analyze the sound data from each of the sound sensors and, for each of the sound sensors, to determine whether to issue a warning based on the analysis of the sound data from the sound sensor.

In a third embodiment, a computer program is embodied on a computer readable medium. The computer program includes computer readable program code for analyzing sound data received at a process control system from a sound sensor and determining whether to issue a warning based on the analysis of the sound data.

In particular embodiments, the computer readable program code for analyzing the sound data includes computer readable program code for comparing the sound data to at least one stored sound.

In other particular embodiments, the computer readable program code for determining whether to issue a warning based on the analysis of the sound data includes computer readable program code for determining a level of similarity between the sound data and the stored sound.

In yet other particular embodiments, the computer readable program code for determining a level of similarity between the sound data and the stored sound includes computer readable program code for determining whether the level of similarity is above a first threshold, below a second threshold, or between the first and second thresholds.

In other particular embodiments, the computer readable program code for determining whether to issue a warning based on the analysis of the sound data includes computer readable program code for determining to issue an alarm when the level of similarity is above the first threshold, to issue an alert when the level of similarity is between the first and second thresholds, and to issue no warning when the level of similarity is below the second threshold.

In still other particular embodiments, the computer readable program code for analyzing the sound data includes computer readable program code for comparing the sound data to a plurality of stored sounds, and the computer readable program code for determining whether to issue a warning based on the analysis of the sound data includes computer readable program code for determining, for each of the plurality of stored sounds, a level of similarity between the sound data and the stored sound.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
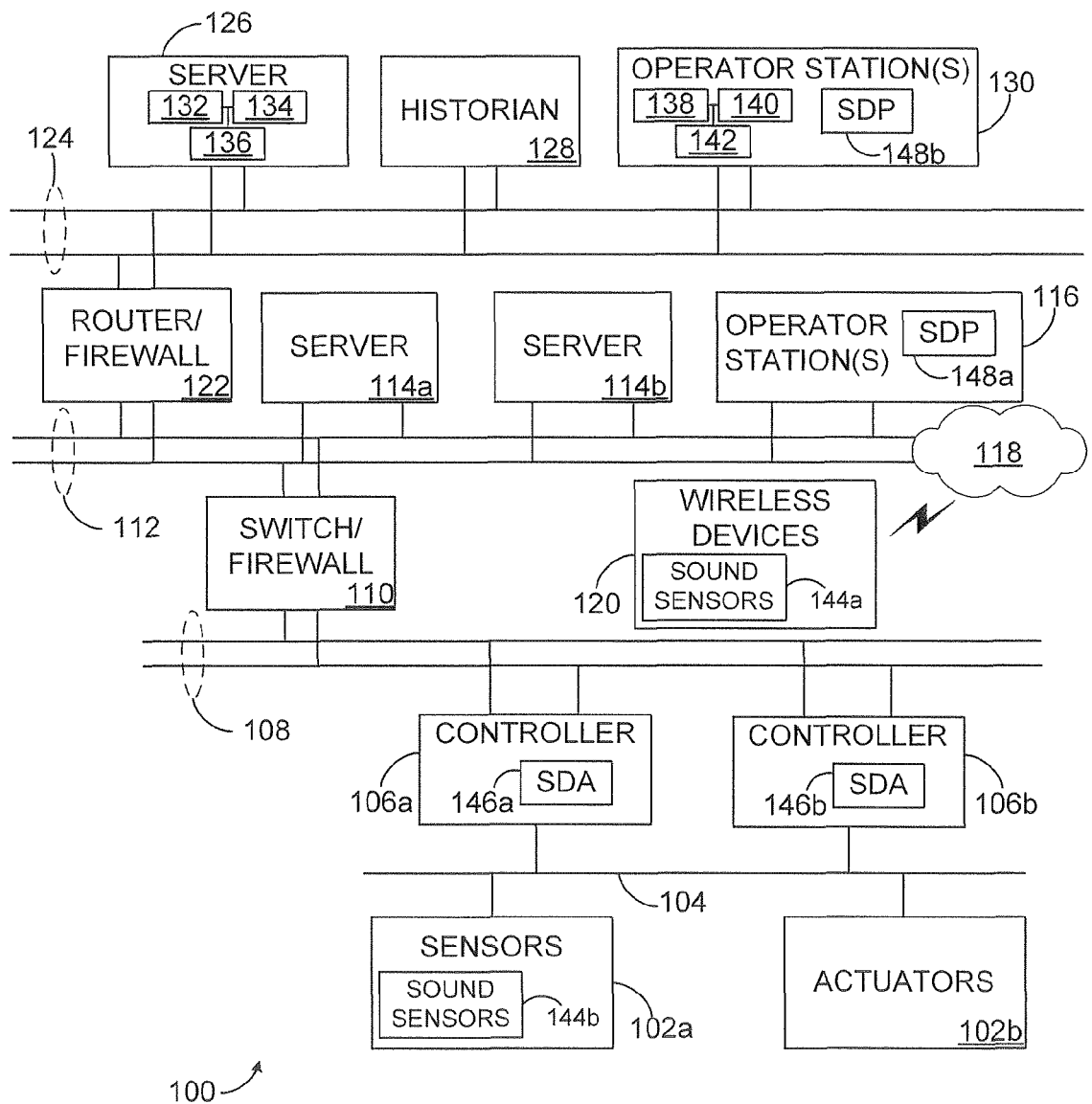
FIG. 1 illustrates a process control system capable of providing sound monitoring of a process system according to one embodiment of this disclosure.
Figure 2:
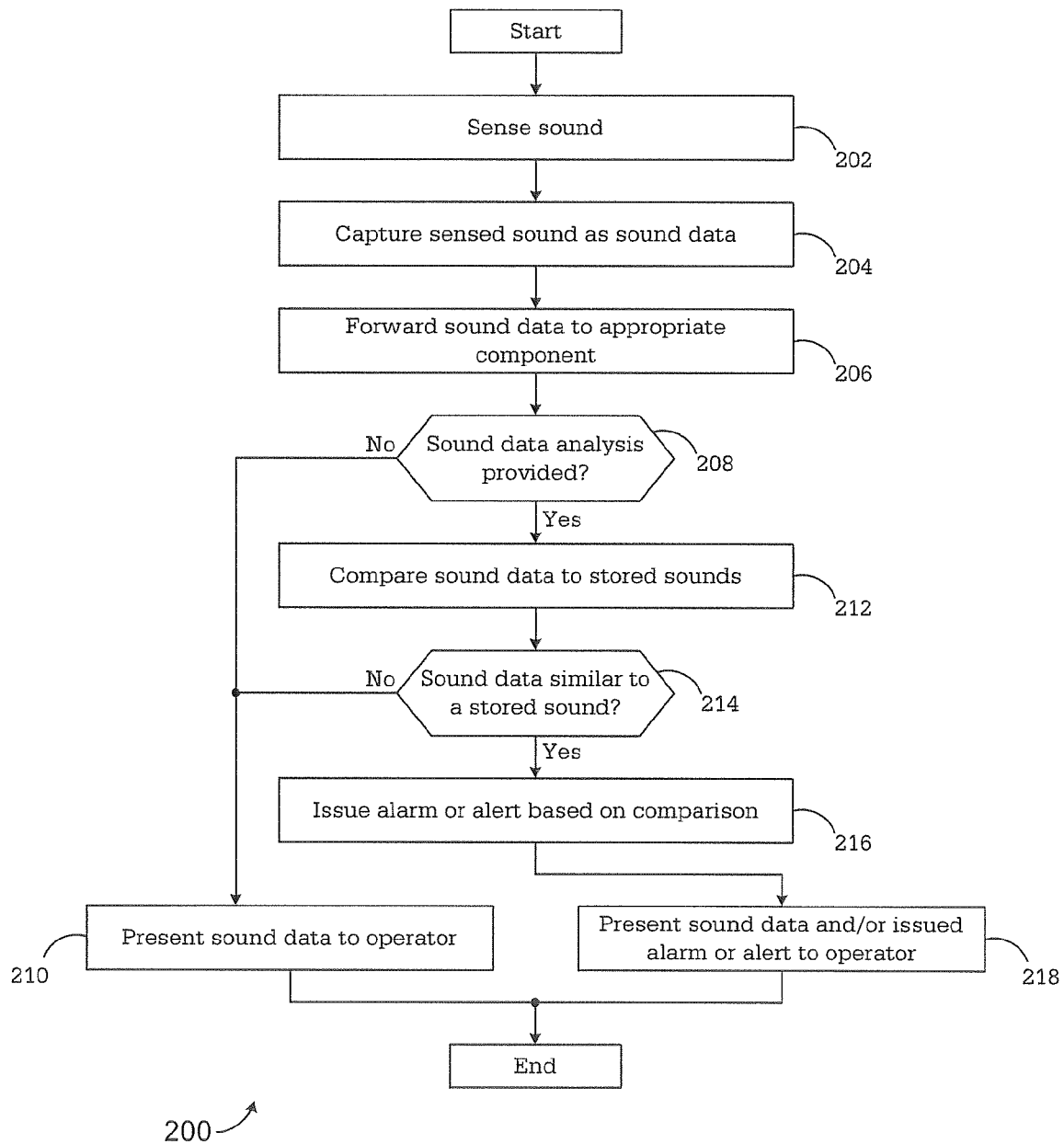
FIG. 2 illustrates a method for monitoring sound in a process system using the process control system of FIG. 1 according to one embodiment of this disclosure.

FIGS. 1 through 2, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates a process control system 100 according to one embodiment of this disclosure. The embodiment of the process control system 100 shown in FIG. 1 is for illustration only. Other embodiments of the process control system 100 may be used without departing from the scope of this disclosure.

In this embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a may measure a wide variety of characteristics in a process system, such as temperature, pressure, or flow rate. Also, the actuators 102b may alter a wide variety of characteristics in the process system and may represent components such as heaters, motors, or valves. The sensors 102a and actuators 102b may represent any other or additional components in any suitable process system. Each of the sensors 102a includes any suitable structure for measuring one or more characteristics in a process system. Each of the actuators 102b includes any suitable structure for operating on or affecting conditions in a process system. Also, a process system may generally represent any system or portion thereof configured to process one or more products or other materials in some manner.

At least one network 104 is coupled to the sensors 102a and actuators 102b. The network 104 facilitates interaction with the sensors 102a and actuators 102b. For example, the network 104 may transport measurement data from the sensors 102a and provide control signals to the actuators 102b. The network 104 may represent any suitable network or combination of networks. As particular examples, the network 104 may represent an Ethernet network, an electrical signal network (such as a HART or FOUNDATION FIELDBUS network), a pneumatic control signal network, or any other or additional type(s) of network(s).

One or more controllers 106a-106b may be coupled to the network 104. The controllers 106a-106b may, among other things, use the measurements from the sensors 102a to control the operation of the actuators 102b. For example, the controllers 106a-106b may receive measurement data from the sensors 102a and use the measurement data to generate control signals for the actuators 102b. Each of the controllers 106a-106b includes any hardware, software, firmware, or combination thereof for interacting with the sensors 102a and controlling the actuators 102b. The controllers 106a-106b may, for example, represent multivariable predictive control (MPC) controllers or other types of controllers that implement control logic (such as logic associating sensor measurement data to actuator control signals). Each of the controllers 106a-106b may, for example, represent a computing device running a MICROSOFT WINDOWS operating system.

One or more networks 108 may be coupled to the controllers 106a-106b. The networks 108 facilitate interaction with the controllers 106a-106b, such as by transporting data to and from the controllers 106a-106b. The networks 108 may represent any suitable networks or combination of networks. As particular examples, the networks 108 may represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 may represent any suitable networks, such as a pair of Ethernet networks or an FTE network.

One or more servers 114a-114b may be coupled to the networks 112. The servers 114a-114b perform various functions to support the operation and control of the controllers 106a-106b, sensors 102a, and actuators 102b. For example, the servers 114a-114b may log information collected or generated by the controllers 106a-106b, such as measurement data from the sensors 102a or control signals for the actuators 102b. The servers 114a-114b may also execute applications that control the operation of the controllers 106a-106b, thereby controlling the operation of the actuators 102b. In addition, the servers 114a-114b may provide secure access to the controllers 106a-106b. Each of the servers 114a-114b includes any hardware, software, firmware, or combination thereof for providing access to, control of, or operations related to the controllers 106a-106b. Each of the servers 114a-114b may, for example, represent a computing device running a MICROSOFT WINDOWS operating system.

One or more operator stations 116 may be coupled to the networks 112. The operator stations 116 represent computing or communication devices providing user access to the servers 114a-114b, which may then provide user access to the controllers 106a-106b (and possibly the sensors 102a and actuators 102b). As particular examples, the operator stations 116 may allow users to review the operational history of the sensors 102a and actuators 102b using information collected by the controllers 106a-106b and/or the servers 114a-114b. The operator stations 116 may also allow the users to adjust the operation of the sensors 102a, actuators 102b, controllers 106a-106b, or servers 114a-114b. In addition, the operator stations 116 may receive and display warnings or other messages or displays generated by the controllers 106a-106b or the servers 114a-114b. Each of the operator stations 116 includes any hardware, software, firmware, or combination thereof for supporting user access and control of the system 100. Each of the operator stations 116 may, for example, represent a computing device running a MICROSOFT WINDOWS operating system.

The system 100 may also include a wireless network 118, which can be used to facilitate communication with one or more wireless devices 120. The wireless network 118 may use any suitable technology to communicate, such as radio frequency (RF) signals. Also, the wireless devices 120 may represent devices that perform any suitable functions. The wireless devices 120 may, for example, represent wireless sensors, wireless actuators, and remote or portable operator stations or other user devices. The network 118 may be coupled to networks 112 or otherwise suitably coupled to the system 100 in order to provide communication between the wireless devices 120 and other components within the system 100.

At least one router/firewall 122 couples the networks 112 to networks 124. The router/firewall 122 includes any suitable structure for providing communication between networks, such as a secure router or combination router/firewall. The networks 124 may represent any suitable networks, such as a pair of Ethernet networks or an FTE network.

The system 100 may also include at least one additional server 126 coupled to the networks 124. The server 126 executes various applications to control the overall operation of the system 100. For example, the system 100 may be used in a processing plant or other facility, and the server 126 may execute applications used to control the plant or other facility. As particular examples, the server 126 may execute applications such as enterprise resource planning (ERP), manufacturing execution system (MES), or any other or additional plant or process control applications. The server 126 includes any hardware, software, firmware, or combination thereof for controlling the overall operation of the system 100.

A historian 128 may also be coupled to the networks 124. The historian 128 generally collects information associated with the operation of the system 100. For example, the historian 128 may collect measurement data associated with the operation of the sensors 102a. The historian 128 may also collect control data provided to the actuators 102b. The historian 128 may collect any other or additional information associated with the process control system 100. The historian 128 includes any suitable storage and retrieval device or devices, such as a database.

One or more operator stations 130 may also be coupled to the networks 124. The operator stations 130 represent computing or communication devices providing, for example, user access to the servers 114a-114b, 126 and the historian 128. Each of the operator stations 130 includes any hardware, software, firmware, or combination thereof for supporting user access and control of the system 100. Each of the operator stations 130 may, for example, represent a computing device running a MICROSOFT WINDOWS operating system.

In particular embodiments, the various servers and operator stations may represent computing devices. For example, each of the servers 114a-114b, 126 may include one or more processors 132 and one or more memories 134 for storing instructions and data used, generated, or collected by the processor(s) 132. Each of the servers 114a-114b, 126 may also include at least one network interface 136, such as one or more Ethernet interfaces. Also, each of the operator stations 116, 130 may include one or more processors 138 and one or more memories 140 for storing instructions and data used, generated, or collected by the processor(s) 138. Each of the operator stations 116, 130 may also include at least one network interface 142, such as one or more Ethernet interfaces.

For the illustrated example, the wireless devices 120 may comprise one or more wireless sound sensors 144a. Similarly, the sensors 102a may comprise one or more wired sound sensors 144b. However, it will be understood that the sound sensors 144a-b may be implemented in the system 100 in any other suitable manner. For example, wireless sound sensors 144a may be coupled to the system 100 through a separate wireless network (not illustrated in FIG. 1). Also, wired sound sensors 144b may be coupled to a dedicated network (not illustrated in FIG. 1) that provides communication between the wired sound sensors 144b and one or more controllers 106. In addition, it will be understood that the system 100 may comprise either wireless sound sensors 144a or wired sound sensors 144b or may comprise a combination thereof.

Each of the sound sensors 144 is operable to sense sounds in proximity to the sensor 144 and to capture those sensed sounds as sound data. The sound sensors 144 are also operable to forward the sound data to one or more components of the system 100 for presentation to an operator of the system 100 and, optionally, for analysis.

For one embodiment, the wireless sound sensors 144a are operable to forward the sound data to other components of the system 100 by way of the wireless network 118, which may be coupled to any suitable network(s), such as networks 112, in the system 100 in order to provide communication between the wireless sound sensors 144a and the other components in the system 100. The wired sound sensors 144b may be coupled to any suitable network(s), such as network 104, in order to communicate with other components in the system 100. Each sound sensor 144 includes any hardware, software, firmware, or combination thereof for sensing sound, capturing sound data, and forwarding the sound data as previously described.

One or more of the controllers 106a-b may comprise a sound data analyzer (SDA) 146a-b. The sound data analyzer 146 is operable to analyze the sound data forwarded to the controller 106 by the sound sensors 144. For example, the sound data analyzer 146 may compare the sound data to one or more stored sounds in order to determine whether or not the sound data is worthy of the issuance of a warning to an operator (i.e., an alarm or an alert). As a particular example, the sound data analyzer 146 may compare the sound data to a stored creaking sound for a storage vessel being filled or emptied. If the sound data is similar enough to the stored creaking sound, the sound data analyzer 146 may determine that an alarm or alert should be issued based on the probability that the storage vessel is indeed creaking, indicating a potential hazard.

The sound data analyzer 146 may determine whether to issue an alarm, to issue an alert, or to do nothing based on which stored sound is similar to the sound data and/or based on how closely the sound data approximates a stored sound. In addition, the sound data analyzer 146 may analyze sound data differently for each sensor 144 and/or set of sensors 144. Thus, for example, the sound data analyzer 146 may compare sounds forwarded from sensors 144 in different types of locations to different stored sounds based on the sounds expected from the specific locations.

The level of similarity that distinguishes between an alarm, an alert and a finding of no similarity may be based on the particular stored sound to which the sound data is being compared. Alternatively, the levels of similarity may be the same for each stored sound. In addition, the levels of similarity may be based on the particular process system being controlled by the process control system 100.

For a particular embodiment, the sound data analyzer 146 may compare the level of similarity to a first threshold and a second threshold. For this embodiment, the sound data analyzer 146 may issue an alarm when the level of similarity is above the first threshold, issue an alert when the level of similarity is between the first and second thresholds, and issue no warning when the level of similarity is below the second threshold.

The stored sounds may be stored locally within the sound data analyzer 146 or in any other suitable location, such as within the controller 106 or in an accessible database coupled to the controller 106 (not illustrated in FIG. 1). In addition, although illustrated in a controller 106, it will be understood that each sound data analyzer 146 may be implemented independently or in any other suitable component of the system 100. For example, the sound data analyzer 146 may be implemented in a server or operator station.

Each sound data analyzer 146 includes any hardware, software, firmware, or combination thereof for analyzing the sound data. As a particular example, each sound data analyzer 146 may represent a software application or collection of applications executed by a controller 106 or by the processor in a server or operator station in the process control system 100.

One or more of the operator stations 116, 130 may comprise a sound data provider (SDP) 148*a-b*. Each sound data provider 148 is operable to provide information about the sound data to an operator of the system 100. For example, the sound data provider 148 may send the sound data to a speaker in order to allow the operator to hear the sounds being sensed by the sound sensors 144. In addition to or instead of this, the sound data provider 148 may provide visual and/or auditory alarms and alerts to the operator based on the results of the analysis provided by the sound data analyzer 146.

Each sound data provider 148 includes any hardware, software, firmware, or combination thereof for providing the sound data. As a particular example, each sound data provider 148 may represent a software application or collection of applications executed by the processor in an operator station in the process control system 100.

In one aspect of operation, at least one of the components in the process control system 100 can implement or support sound monitoring functionality that allows operators to receive sound data and act to minimize or correct any problems existing within the processes being used in the process system based on the sound data. For example, at least one sound sensor 144 is used in the system 100 to generate sound data, which corresponds to the sounds in monitored locations. A sound data analyzer 146 and/or a sound data provider 148 may facilitate the identification of potential problems at the monitored locations based on the sound data received from the sound sensors 144.

In traditional distributed control system (DCS) environments, process monitoring is typically done by monitoring video of remote and/or hazardous areas. However, sound provided from these areas provides useful information that is unavailable in current video monitoring technology. Thus, without the sound data, the operator may miss important information that may be used to provide operational improvements or that may be used to avoid or mitigate abnormal or dangerous situations.

Although FIG. 1 illustrates one example of a process control system 100, various changes may be made to FIG. 1. For example, a control system may include any number of sensors, actuators, controllers, servers, operator stations, and networks. Also, the makeup and arrangement of the process control system 100 in FIG. 1 is for illustration only. Components may be added, omitted, combined, or placed in any other suitable configuration according to particular needs. In addition, FIG. 1 illustrates one operational environment in which sound monitoring may be used. This functionality may be used in any other suitable device or system.

FIG. 2 illustrates a method 200 for monitoring sound in a process system using the process control system 100 according to one embodiment of this disclosure. The embodiment of the method 200 is for illustration only. Other embodiments of the method 200 may be implemented without departing from the scope of this disclosure.

As shown in FIG. 2, a method 200 includes sensing sound in a particular area at step 202. This may include, for example, a sound sensor 144 in a process system sensing sounds in proximity to the sensor 144. The sensed sound is captured as sound data at step 204. This may include, for example, the sound sensor 144 capturing the sensed sounds as sound data.

The sound data is forwarded to the appropriate component(s) of the process control system 100 at step 206. This may include, for example, the sound sensors 144 forwarding the sound data to a controller 106, an operator station 116, 130 and/or any other suitable component of the system 100. For one embodiment, the sound data is forwarded to a controller 106 comprising a sound data analyzer 146 for analysis and/or to an operator station 116, 130 comprising a sound data provider 148 for presentation to an operator of the system 100.

If the system 100 does not provide sound data analysis (at step 208), the sound data is presented to an operator at step 210. For example, if the system 100 does not comprise a sound data analyzer 146 that is currently operating to analyze sound data for the sensor 144 (at step 208), the sound data may be presented by a sound data provider 148. For a particular example, the sound data provider 148 sends the sound data to a speaker in order to allow the operator to hear the sounds being sensed by the sound sensor 144.

However, if the system 100 does provide sound data analysis (at step 208), the sound data is analyzed by being compared to stored sounds at step 212. For example, if the system 100 comprises a sound data analyzer 146 that is currently operating to analyze sound data for the sensor 144 (at step 208), the sound data may be analyzed by the sound data analyzer 146.

If the sound data is not similar to a stored sound (at step 214), the sound data may be presented to an operator at step 210, as previously described. However, for an alternative embodiment, when the sound data is not similar to a stored sound (at step 214), the method comes to an end without the sound data being presented to the operator.

If the sound data is similar to a stored sound (at step 214), an alarm or alert is issued based on the comparison of the sound data to the stored sound at step 216. For example, the sound data analyzer 146 may issue an alarm when the sound data is more similar to the stored sound and an alert when the sound data is less similar to the stored sound. As previously described, the level of similarity that distinguishes between an alarm, an alert and a finding of no similarity may be based on the stored sounds and/or on the particular process system being controlled by the process control system 100.

The sound data and/or the alarm or alert issued based on the sound data is presented to an operator at step 218, at which point the method comes to an end. This may include, for example, the sound data and/or the alarm or alert being presented by a sound data provider 148. For a particular example, the sound data provider 148 may send the sound data to a speaker in order to allow the operator to hear the sounds being sensed by the sound sensor 144 and/or may provide to the operator a visual and/or an auditory indicator of the alarm or alert issued by the sound data analyzer 146.

Although FIG. 2 illustrates an example of a method 200 for monitoring sound in a process system using a process control system, various changes may be made to this method 200. For example, the sound data may be analyzed in any other suitable manner in order to obtain other useful information based on the sound sensed by the sound sensors 144. Also, while shown as a series of steps, the steps in the method 200 may overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    sensing sound generated by equipment in a processing facility using one or more sensors positioned in proximity to the equipment;
    capturing the sensed sound as sound data;
    forwarding the sound data to a process control system;
    analyzing the sound data at the process control system to determine whether the equipment is functioning abnormally;
    determining whether to issue a warning based on the analysis of the sound data;
    issuing the warning in response to determining that the sound data is within a threshold level of similarity of a stored sound;
    determining whether to forward the sound data to an operator station based on the analysis of the sound data; and
    forwarding the sound data to the operator station in response to determining that the sound data is not within the threshold level of similarity of the stored sound.

2. The method of claim 1, wherein forwarding the sound data to the process control system comprises forwarding the sound data to a controller within the process control system.

3. The method of claim 1, wherein the one or more sensors are located remotely from the process control system, and wherein forwarding the sound data to the process control system comprises transmitting the sound data over a wireless network from the one or more sensors.

4. The method of claim 1, further comprising sending the sound data from the operator station to a speaker.

5. The method of claim 1, wherein determining whether to issue the warning based on the analysis of the sound data further comprises:
    issuing the warning when the analysis of the sound data recorded from the equipment indicates that the equipment is functioning abnormally.

6. The method of claim 1, wherein forwarding the sound data to the process control system comprises forwarding the sound data to the process control system exactly as captured.

7. The method of claim 1, further comprising:
    forwarding the sound data to the operator station in response to issuing the warning.

8. The method of claim 1, wherein determining whether to issue the warning comprises:
    determining whether a level of similarity between the sound data and the stored sound is above a first threshold, below a second threshold, or between the first and second thresholds.

9. The method of claim 8, wherein determining whether to issue the warning comprises:
    deciding to issue an alarm when the level of similarity is above the first threshold;
    deciding to issue an alert when the level of similarity is between the first and second thresholds; and
    deciding to issue no warning when the level of similarity is below the second threshold.

10. A system comprising:
    a sound sensor positioned in proximity to equipment in a processing facility, the sound sensor configured to sense sound generated by the equipment, to capture the sensed sound as sound data, and to forward the sound data to a process control system; and
    a sound data analyzer within the process control system, the sound data analyzer configured to analyze the sound data to determine whether the equipment is functioning abnormally, to determine whether to issue a warning based on the analysis of the sound data, to issue the warning in response to determining that the sound data is within a threshold level of similarity of a stored sound, to determine whether to forward the sound data to an operator station based on the analysis of the sound data, and to forward the sound data to the operator station in response to determining that the sound data is not within the threshold level of similarity of the stored sound.

11. The system of claim 10, wherein the sound sensor comprises a wireless sound sensor.

12. The system of claim 10, further comprising a sound data provider within the process control system, the sound data provider configured to send the sound data to a speaker.

13. The system of claim 10, further comprising:
a plurality of sound sensors, each of the sound sensors configured to sense sound at a specified location, to capture the sensed sound as sound data, and to forward the sound data from the specified location to the process control system.

14. The system of claim 10, wherein the sound sensor is configured to forward the sound data to the process control system exactly as captured.

15. The system of claim 10, wherein the sound data analyzer is configured to forward the sound data to the operator station in response to the warning.

16. The system of claim 10, wherein the sound data analyzer is configured to determine whether to issue the warning by determining whether a level of similarity between the sound data and the stored sound is above a first threshold, below a second threshold, or between the first and second thresholds.

17. The system of claim 16, wherein the sound data analyzer is configured to determine whether to issue the warning by:
deciding to issue an alarm when the level of similarity is above the first threshold;
deciding to issue an alert when the level of similarity is between the first and second thresholds; and
deciding to issue no warning when the level of similarity is below the second threshold.

18. A non-transitory computer readable medium embodying a computer program, the computer program comprising computer readable program code for:
analyzing sound data received at a process control system from a sound sensor to determine whether equipment positioned in proximity to the sound sensor is functioning abnormally;
determining whether to issue a warning based on the analysis of the sound data;
issuing the warning in response to determining that the sound data is within a threshold level of similarity of a stored sound;
determining whether to forward the sound data to an operator station based on the analysis of the sound data; and
forwarding the sound data to the operator station in response to determining that the sound data is not within the threshold level of similarity of the stored sound.

19. The computer readable medium of claim 18, the computer readable program code for determining whether to issue the warning based on the analysis of the sound data comprising computer readable program code for determining whether a level of similarity between the sound data and the stored sound is above a first threshold, below a second threshold, or between the first and second thresholds.

20. The computer readable medium of claim 19, the computer readable program code for determining whether to issue the warning based on the analysis of the sound data comprising computer readable program code for determining to issue an alarm when the level of similarity is above the first threshold, to issue an alert when the level of similarity is between the first and second thresholds, and to issue no warning when the level of similarity is below the second threshold.

* * * * *